(12) United States Patent
Lapulalan

(10) Patent No.: US 9,430,468 B2
(45) Date of Patent: Aug. 30, 2016

(54) ONLINE PEER REVIEW SYSTEM AND METHOD

(75) Inventor: Robin Jason Lapulalan, Rotterdam (NL)

(73) Assignee: Elsevier BV, Amsterdam (NL)

( * ) Notice: Subject to any disclaimer, the term of this patent is extended or adjusted under 35 U.S.C. 154(b) by 577 days.

(21) Appl. No.: 13/536,700

(22) Filed: Jun. 28, 2012

(65) Prior Publication Data

US 2014/0006341 A1    Jan. 2, 2014

(51) Int. Cl.
*G06F 17/30* (2006.01)

(52) U.S. Cl.
CPC ......... *G06F 17/30* (2013.01); *G06F 17/30011* (2013.01)

(58) Field of Classification Search
CPC .................. G06F 17/30867; G06F 17/30699; G06F 17/3089; G06F 17/30705
USPC ......................................... 707/768, E17.008
See application file for complete search history.

(56) References Cited

U.S. PATENT DOCUMENTS

| | | | |
|---|---|---|---|
| 6,178,430 B1* | 1/2001 | Cohen et al. | 715/273 |
| 2001/0047357 A1* | 11/2001 | Vaithilingam et al. | 707/100 |
| 2003/0135607 A1* | 7/2003 | Bernard et al. | 709/224 |
| 2004/0034631 A1* | 2/2004 | Julliard et al. | 707/4 |
| 2004/0034652 A1* | 2/2004 | Hofmann | G06F 17/30699 |
| 2004/0205580 A1* | 10/2004 | De Angelis et al. | 715/513 |
| 2005/0004951 A1* | 1/2005 | Ciaramitaro et al. | 707/104.1 |
| 2006/0123348 A1* | 6/2006 | Ross | G06F 17/243 715/751 |
| 2006/0184865 A1* | 8/2006 | Chakraborty | 715/500 |
| 2006/0282762 A1* | 12/2006 | Diamond et al. | 715/511 |
| 2007/0118802 A1* | 5/2007 | Gerace | G06F 17/30867 715/738 |
| 2007/0143098 A1* | 6/2007 | Van Den Berg et al. | 704/1 |
| 2008/0307321 A1* | 12/2008 | Long | 715/752 |
| 2008/0320579 A1* | 12/2008 | Rollins | G06F 17/24 726/10 |
| 2010/0106669 A1* | 4/2010 | Guo | G09B 7/02 706/11 |
| 2010/0145904 A1* | 6/2010 | Riviello et al. | 707/608 |
| 2011/0072013 A1* | 3/2011 | Mosoi et al. | 707/736 |
| 2013/0132886 A1* | 5/2013 | Mangini et al. | 715/781 |

* cited by examiner

*Primary Examiner* — Shiow-Jy Fan
(74) *Attorney, Agent, or Firm* — Dinsmore & Shohl LLP

(57) ABSTRACT

An online document management system is disclosed. In one embodiment, the online document management system comprises: one or more editorial computers operated by one or more administrators or editors, the editorial computers send invitations and manage peer review of document submissions; one or more system computers, the system computers maintain journals, records of submitted documents and user profiles, and issue notifications; and one or more user computers; the user computers submit documents or revisions to the document management system; wherein one or more of the editorial computers coordinate with one or more of the system computers to migrate one or more documents between journals maintained by the online document management system.

16 Claims, 11 Drawing Sheets

ONLINE PEER REVIEW SYSTEM AND METHOD

FIELD OF INVENTION

The present invention relates in general to online scientific peer review systems, and in particular to a novel online journal management and publishing solution which is designed to create a flexible, intuitive, intelligent and enterprise scale user-centered solution which is designed in a modular fashion to easily and quickly add new features and offer integration points.

BRIEF DESCRIPTION OF PRIOR ART

There exist a number of online scientific peer review systems. All of these systems offer the same basic functions such as interfaces for authors to submit, upload or download articles related to a journal, as well as interfaces for reviewers to review the articles, and for editors to accept or reject articles. A summary of the major existing online scientific peer review systems is provided below.

The first system is an open source online journal publishing system called the "Open Journal System". It is sponsored by the Simon Fraser University. An online user's guide is available at: http://pkp.sfu.ca/ojs/docs/userguide/2.3.3/index.html. The Open Journal System provides interfaces for users to upload/download submissions and it supports multiple languages. It also provides an interface for reviewers to manage the submission under review.

The second system is a commercially-available online manuscript submission and peer review software system called "Editorial Manager" from Aries Systems. An online user's guide is available at http://www.editorialmanager.com/homepage/home.htm. The Editorial Manager software manages submissions, editorial functions and peer review. It uses a customized interface to transfer accepted manuscripts to publishers such as Oxford University Press, Elsevier, etc. It also tracks referee activity, and automatically emails appropriate reminders.

Aries Systems also partners with a company called "iThenticate". iThenticate has a commercially-available software called "iThenticate Plagiarism Checker" for plagiarism detection. Because iThenticate has a partnership with Aries Systems, it apparently allows Aries' editorial and peer review system to detect plagiarism.

The third online journal publishing system is a commercially-available peer review journal management system called "ScholarOne Manuscripts" from Thomson Reuters. The ScholarOne Manuscripts system also uses iThenticate Plagiarism Checker for plagiarism detection. It enables users to execute task assignments, e-mail reminders, and web-based research tools automatically. It also captures data and files in multiple languages and formats and converts them into PDF or HTML documents on the fly. It also allows the user to enter customized journal article metadata.

All of these existing systems are, to some degree, not convenient to use. For example, these existing systems only offer a shared database among sister journals, whereas a shared database is not available for non-sister journals, for example, journals that are not owned by related entities. Thus, it is impossible for these existing systems to accommodate the user's request to switch from a sister journal to a non-sister journal. Moreover, none of these systems provide convenient interfaces to facilitate the communications between editors, users and reviewers. In addition, it is difficult to add new features to the current online journal publishing systems.

There is therefore a need to develop a more flexible and convenient online journal publishing system.

SUMMARY OF THE INVENTION

One aspect of the invention is directed to an online document management system. The system comprises one or more editorial computers operated by one or more administrators or editors, the editorial computers send invitations and manage review, such as peer review, of document submissions; one or more system computers, the system computers maintain journals, records of submitted documents and user profiles, and issue notifications; and one or more user computers; the user computers submit documents or revisions to the document management system. In one embodiment, the one or more of said editorial computers coordinate with one or more of the system computers to migrate one or more documents between journals maintained by the online document management system.

Another aspect of the invention is directed to a method of managing documents submitted online. The method comprises: initiating invitations from one or more editorial computers operated by one or more journal editors to one or more user computers operated by one or more users on one or more journals; submitting documents from one or more of the user computers to one or more system computers; the system computers maintaining journals, records of submitted documents and user profiles; providing comments on the submitted documents from one or more computers operated by one or more reviewers; and migrating one or more submitted documents between journals maintained by one or more of the system computers.

DETAILED DESCRIPTION OF PREFERRED EMBODIMENTS

Figure 1:
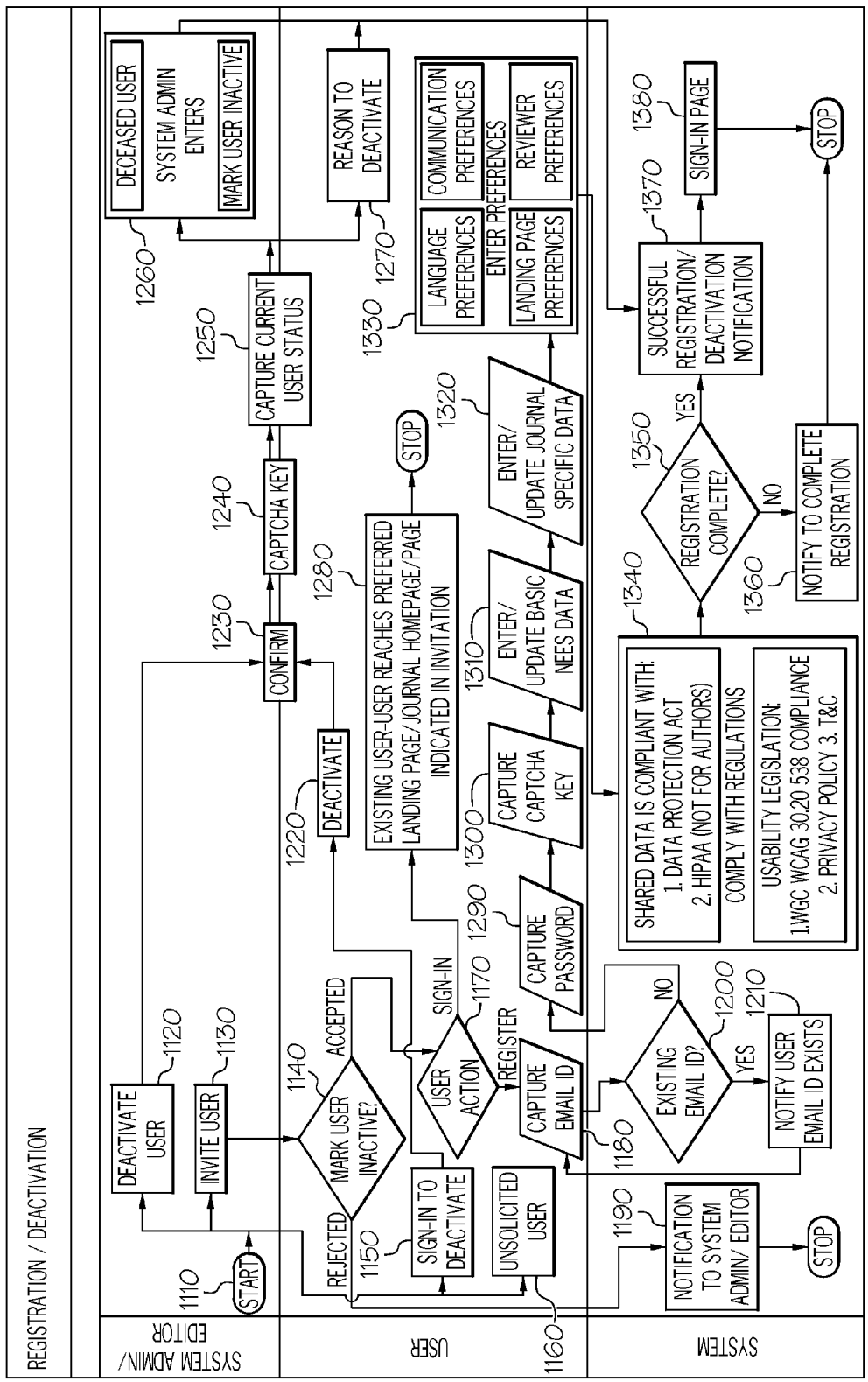
FIG. 1 schematically depicts a user registration/deactivation process that is implemented on one or more computers in one or more networks according to one embodiment of the invention.

FIG. 1 schematically depicts a user registration/deactivation process that is implemented on one or more computers in one or more networks according to one embodiment of the invention. The user registration/deactivation process enables a user to register or deactivate with the journal publishing system. Once the process starts at step 1110, it may encounter one or more of the following four situations:

1) an Editor sends an invitation to a user or a Reviewer;
2) an invited (or unsolicited) user initiates the process to register with the system
3) an invited (or unsolicited) user signs-in to deactivate
4) a system administrator or an Editor decides to deactivate a user The process steps that are involved in the 4 situations above are explained below.

First, if, in step 1130, an Editor sends an invitation to a user or Reviewer, the process moves to step 1140 to check the status of the invitation. If the invitation is rejected, then the process moves to step 1190, where a notification is sent to the system administrator or the Editor, and the process will stop its execution. If the invitation is accepted by a user/Reviewer, then the process moves to step 1170 to wait for a user action. If the user/Reviewer decides to register with the journal publishing system of the invention, then the process goes to step 1180 to prompt the user/Reviewer to enter his/her Email Id (such as an email address). In step 1200, the process verifies whether the Email Id already exists in the system's record. If so, a notification is sent in step 1210 to the user/Reviewer and the process loops back to step 1180. Here, the user/Reviewer may choose to re-register using a different Email Id, or user the existing Email Id to sign-in. If the user/Review chose to sign-in, then in step 1280 a web-page is displayed to the user/Reviewer to provide an interface for the user/Review to perform other actions. In one embodiment, the web-page is the default journal homepage. The web-page may also be a user-specific homepage showing user-preferred information, such as information regarding user-preferred journals in the system. In another embodiment, the web-page may be a page indicated in the invitation or a user-preferred website.

If, in step 1200, the process determines the Email Id does not exist in the system's record, then in step 1290 the user/Reviewer is prompted to enter a password. A CAPTCHA test is then generated by the system in step 1300 and the user/Review is prompted to enter the necessary information required by the CAPTCHA KEY. In step 1310, the process enters or updates the system record for this newly entered user data. In step 1320, the process enters or updates data for specific journals in connection with the new record Then, in step 1330, the user/Reviewer is prompted to enter his/her preferences. For example, the preferred language, the preferred way of communication (e.g. emails, phone call, etc.), preferred reviewers, preferred webpage (landing page) after signing-in, etc. Next, in step 1340, the user/Reviewer is prompted to review and confirm that he/she will comply with a set of Regulations. In one embodiment, the Regulations include the Statement on Ethics in Publishing. Then, step 1350 checks if the registration is complete. If so, the process moves to step 1370 to issue a successful registration notification that will be displayed on the user's sign-in page in step 1380. If not, the user/Reviewer will be notified that the registration is incomplete in step 1360.

If, in step 1160, an uninvited user initiates the process, then the process moves to step 1170 to determine the user action and then moves to step 1180 or 1280 depending on whether the user action is registration or sign-in.

If, in step 1150, a user signs in to deactivate from the system, the process then executes a deactivate procedure in step 1220. Then in step 1230, it prompts the user to confirm deactivation. A CAPTCHA key is generated by the process in step 1240 and the user is prompted to enter it. Then, in step 1250, the current user status is captured by the process and the system administrator is notified in step 1260 that the user should be marked inactive. In one embodiment, the user is prompted to enter the reason for deactivation in step 1270, and the results of steps 1260 and 1270 are used in step 1370 for the process to issue a deactivation notification that will be displayed on the user's sign-in page in step 1380.

If, in step 1120, a system administrator or an Editor decides to deactivate a user, the process will directly move to step 1230, which prompts the system administrator or Editor for confirmation. A CAPTCHA key is generated by the process in step 1240 and the system administrator or Editor is prompted to enter it. The process then goes to steps 1260, 1270, 1370, 1380 as described above.

Figure 2:
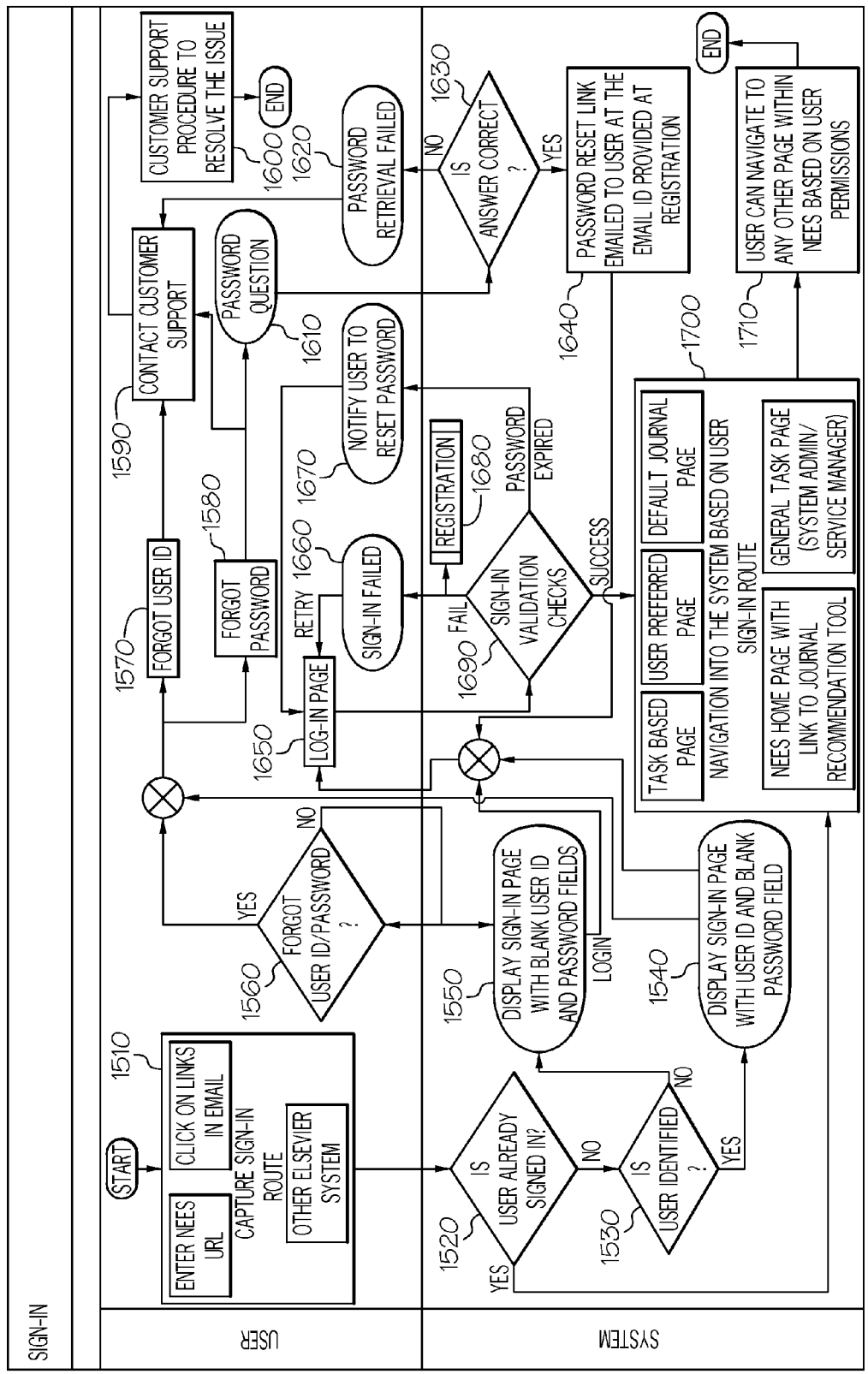
FIG. 2 schematically depicts a user login process that is implemented on one or more computers in one or more networks according to one embodiment of the invention.

FIG. 2 schematically depicts a user login process that is implemented on one or more computers in one or more networks according to one embodiment of the invention. The user login process enables a user to gain access to the journal publishing system.

According to FIG. 2, in step 1510, a user initiates the login process by entering the URL of the online journal publishing system, or by clicking on a link in an email that is directing the login webpage, or by other ways enabled by the journal publishing system. Then, in step 1520, the journal publishing system determines if the user has already signed-in. If so, the process moves to step 1700 where a corresponding web page is displayed to the user. The web page may be a user preferred web page defined by the user, or a default journal web page set by the journal administrator, or a "task based" web page whose content depends on the tasks the user intends to work on, or a "general task page" showing a list of tasks for the system administrator or service manager to work on, or a journal home page with links to journal recommended tools. Next, in step 1710, the user can navigate to any other web page within the journal based on the user permission set by the system administrator.

If step 1530 determines that the user has not signed-in, then in step 1530 the process check if the user has been identified. If so, the process in step 1540 displays a sign-in page showing the user ID and a blank password field. If not, the process in step 1550 displays a sign-in page with blank user ID and password fields. The user can then sign in by entering the user ID and password in step 1650. After receiving the user ID and password, the process in step 1690 verifies if the information entered is correct. If yes, then the process moves to step 1700. If the verification fails, the process moves to step 1660, where a "sign-in failed" message is displayed and the user is directed to step 1650 and is prompted to retry the user ID and password. If the verification step 1690 finds that the password has expired, the user is then notified in step 1670 to reset the password. After the user resets the password, the user is directed to the login page of step 1650 to re-enter the user ID and password. If the verification step 1690 finds that the user has not been registered, the user is then directed to step 1680 to register.

In one embodiment, the sign-in page has a "forgot user ID/password" link, and step 1560 is invoked to see if the user clicks on such a link. If the user forgets his/her user ID/password, then the process moves to a sub-process to retrieve/reset user ID and password. If the user ID is forgotten (step 1570), then the process moves to step 1590 to prompt the user to contact customer support and a customer support procedure 1600 may be developed to resolve the issue. For example, customer support will retrieve the user ID if the user provides other information (such as social security number, etc) that verifies his/her identity. If the user forgot his/her password, the user may also be directed to customer support in step 1590 and then uses the customer support procedure to reset or retrieve the password. Alternatively, the user could be prompted to answer certain pre-set password question(s) in step 1610. Then step 1630 determines if the user's answer(s) are correct. If so, the processor moves to step 1640, where a password reset link is sent to the user's email ID that is provided at registration. After resetting the password, the user is directed to the login page of step 1650. If the user's answer(s) are not correct, then in step 1620 a "password retrieval failed" message will be displayed and the user is directed to step 1590 to contact customer support.

Figure 3:
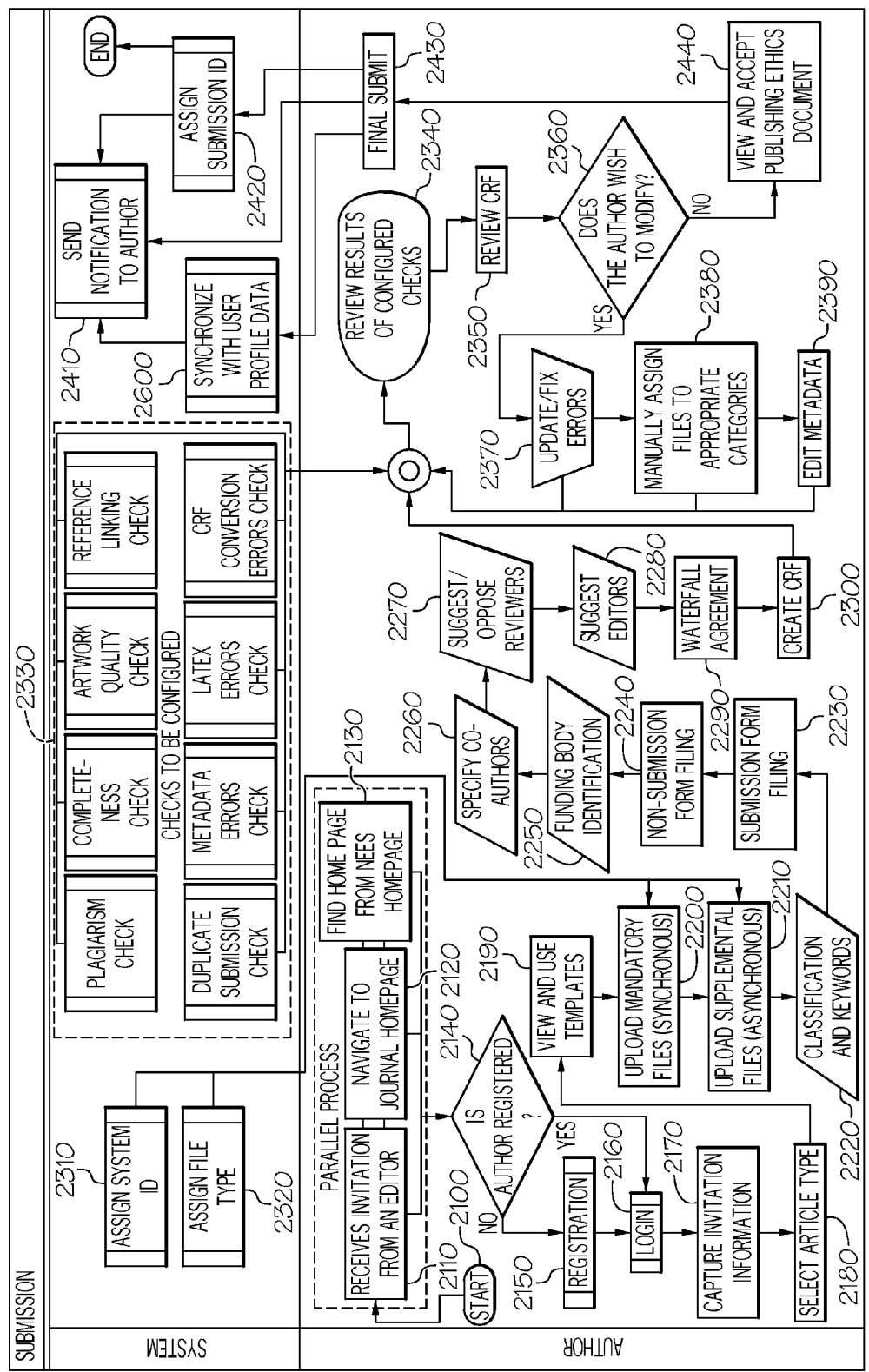
FIG. 3 schematically depicts a submission process that is implemented on one or more computers in one or more networks according to one embodiment of the invention.

FIG. 3 schematically depicts a submission process that is implemented on one or more computers in one or more networks according to one embodiment of the invention. The process starts in step 2100. In one embodiment, the submission process may be initiated by an author receiving an invitation from an Editor 2110, an author navigates to a journal home page 2120, or an author finds the journal home page from the journal publishing system's home page 2130. In one embodiment, the steps 2110-2130 may be executed in parallel. After the author finds the journal's homepage, the process in step 2140 checks if the author is registered. If yes, the author is prompted to login in step 2160. If no, then the author is prompted to register first in step 2150, and then is directed to the login page in step 2160. After login, the author is prompted to enter invitation information in step 2170, and then to select article type in step 2180. Based on the type selected, the author can view and use certain templates to format his/her article before submission in step 2190. If an author uses certain templates, certain metadata can be extracted before the author manually enters the data. Then, in steps 2200 and 2210, the user uploads the mandatory and supplemental files of the article to the journal publishing system.

After uploading the article, the author may be prompted to enter classification and key word information of the submitted article in step 2220. Then, in step 2230, the author is prompted to fill in a submission form. In step 2240, the author is prompted to fill in a non-submission form. In one embodiment, the non-submission form requests additional information not directly related to the content of the submitted article, e.g. the name of the entity that provides funding to the research that has resulted in the article. In step 2250, the author then enters funding body identification information. Then in step 2260, the author is prompted to specify co-authors, if any. In step 2270, the author may suggest or oppose reviewers, and in step 2280, the author may make suggestions of choice of Editors. The process then moves to step 2290 where the author may be asked to agree to a 'Water Fall Agreement" which governs copyright issues, and potential submission to other journals. Then, in step 2300, a Common Readable Format file (CRF) of the article is created for review. In one embodiment, the CRF is HTML format. Rendering the article in HTML format makes the online journal publishing system faster and lighter, and more compatible with mobile applications.

The journal publishing system assigns a system Id 2310 and File Type 2320 to the article submitted in steps 2200 and 2210. The system also performs a series of checks in step 2330. In one embodiment, these checks include a plagiarism check (the result of plagiarism check may not be displayed only to the editor), a completeness check, an artwork quality check, a reference linking check, a duplication submission check, and a metadata errors check. These checks may also include a LaTex errors check, if the article is written in LaTex language. There may also be a CRF conversion error check to make sure the CRF conversion of the article is done properly.

After these checks, the author in step 2340 reviews the results of the checks, and reviews the CRF as converted in step 2350. The process then asks the author if he/she wishes to modify the article. If no, then the process moves to step 2440, where the author is asked to view and accept a publishing ethics document. Then, the author makes the final submission in step 2430. The publishing system will then sync the submission data with the author's user profile data in step 2400, send a submission notification to the author in step 2410, and assign a submission Id to the article being submitted in step 2420. If the author wishes to modify the article, the author will have a chance to update the article and fix errors in step 2370, manually assign files to appropriate categories in step 2380 and edit metadata of the article in step 2390.

Figure 4:
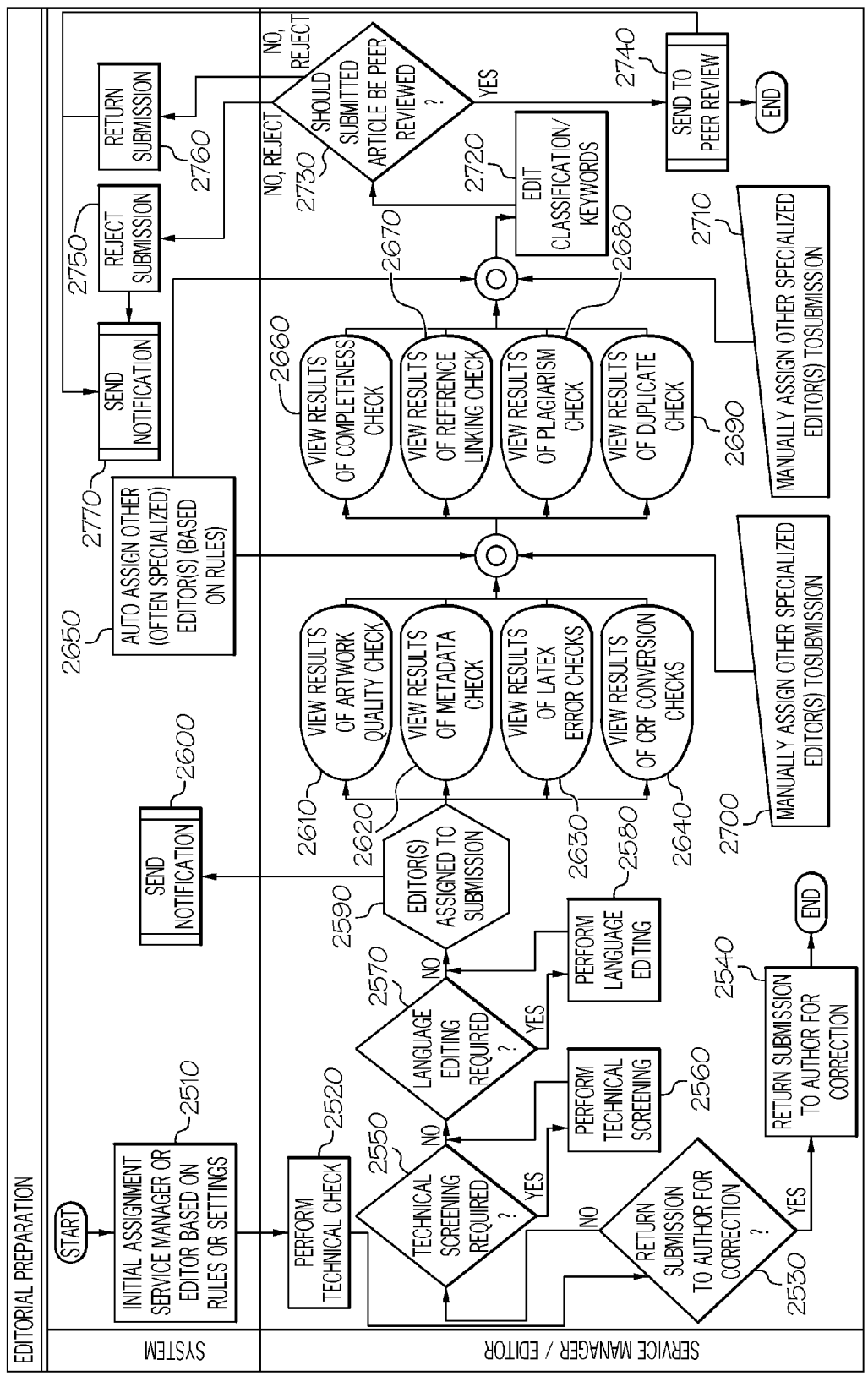
FIG. 4 schematically depicts an editorial preparation process that is implemented on one or more computers in one or more networks according to one embodiment of the invention.

FIG. 4 schematically depicts an editorial preparation process that is implemented on one or more computers in one or more networks according to one embodiment of the invention. The process starts in step 2510, where the online publishing system makes an initial assignment of service manager or editor according to certain rules or system settings. In step 2520, the service manager/editor performs a technical check on the submitted article. In one embodiment, the technical check may be outsourced to an external entity. In step 2530, the service manager/editor decides whether to return the article to the author for correction. If yes, the article is returned in step 2540. If no, the service manager/editor decides in step 2550 if technical screening of the article is required, and if so, technical screening is performed in step 2560. Next, the service manager/editor decides in step 2570 if language editing is required, and if so, language editing is performed in step 2580. In one embodiment, the language editing may be outsourced to an external entity. In step 2590, the service manager/editor assigns the editor(s) to handle the current submission, and a notification is sent to the publishing system in step 2600. Next, the service manager/editor reviews the results of technical checks. In one embodiment, these checks include artwork quality check 2610, metadata check 2620, LaTex error checks 2630 and CRF conversion checks 2640.

After reviewing these results, the service manager/editor may, in step 2700, manually assign other specialized editor(s) to the submitted article. The publishing system may also, in step 2650, automatically assign other (often specialized) editor(s) to the submitted article, based on rules. Next, the service manager/editor reviews the results of technical screening (if any). In one embodiment, these results include the results of completeness check 2660, the results of reference linking check 2670, the results of plagiarism check 2680 and the results of duplicate check 2690. After reviewing these results, the service manager/editor may, in step 2710, manually assign other specialized editor(s) to the submitted article. The publishing system may also, in step 2650, automatically assign other (often specialized) editor(s) to the submitted article Next, in step 2720, the service manager/editor edits the classification/keywords of the submitted article. Then, in step 2730, the service manager/editor decides whether the submitted article should be peer-reviewed. If yes, the article is sent to the peer review process in step 2740. If it is decided that the article be returned to the author for correction, then the article is returned in step 2760. Or, if it is decided that the article is to be rejected, then in step 2750 the article is rejected. In step 2770, the publishing system sends notifications to the author regarding the service manager/editor's decision in steps 2740-2760.

Figure 5:
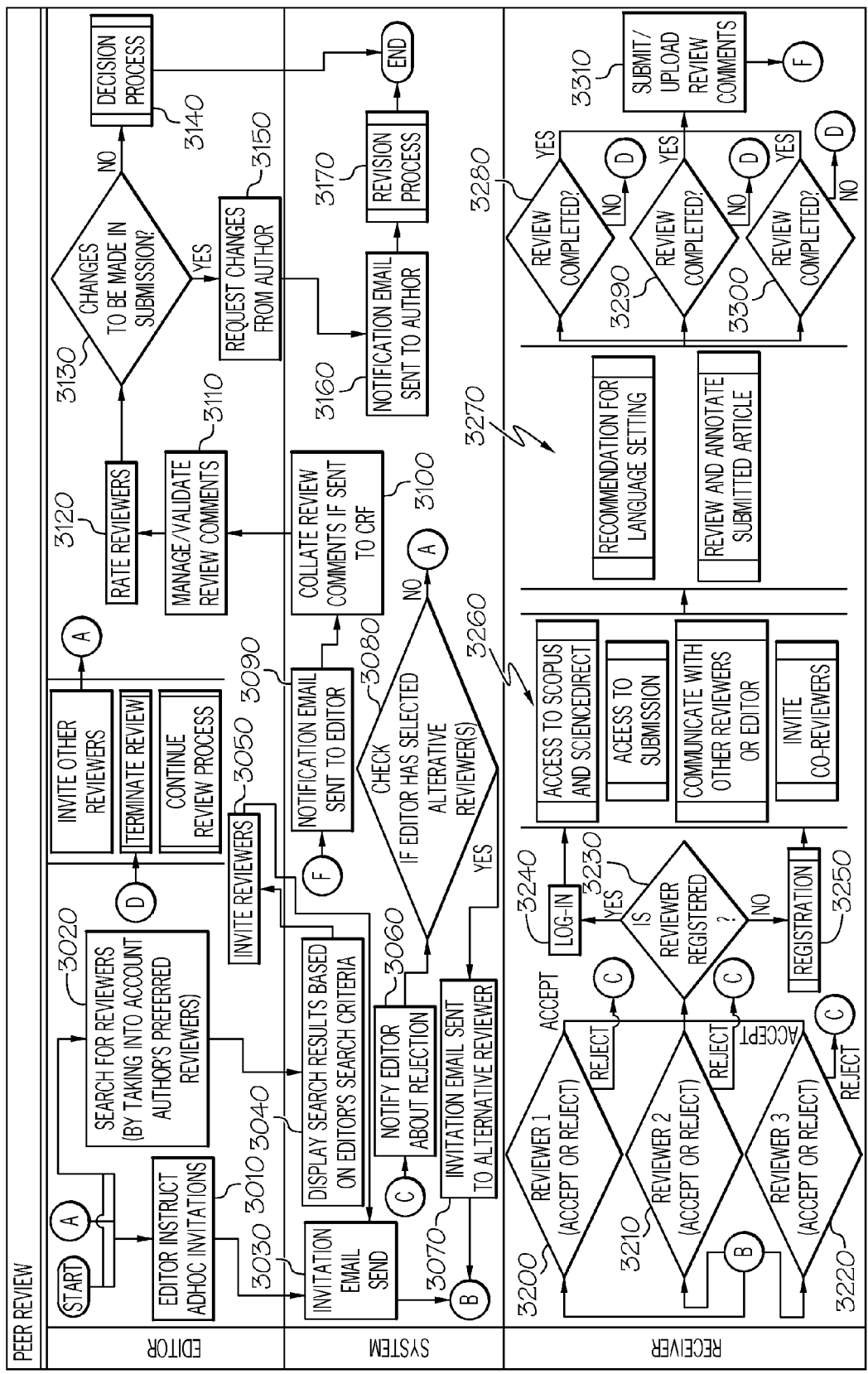
FIG. 5 schematically depicts a peer review process that is implemented on one or more computers in one or more networks according to one embodiment of the invention.

FIG. 5 schematically depicts a peer review process that is implemented on one or more computers in one or more networks according to one embodiment of the invention. The process involves the editor, the publishing system and the reviewer. The process starts when the editor invites the reviewer to review a submitted article. In step 3010, the editor may instruct the publishing system to send ad hoc invitation emails to many potential reviewers. The editor may also in step 3020, first search for reviewers by taking into account the author's preferred reviewers. The publishing system then displays the search results based on the editor's search criteria in step 3040. Then, the editor in step 3050 chooses the reviewer to invite based on the displayed search results. The publishing system, in step 3030, sends an invitation email to the reviewers selected by the editor. In one embodiment, the search for reviewers is carried out using the People Finder technology described in Netherlands patent no. 20001015151, titled "Apparatus, Method and Software for generating a Knowledge Profile and the Search for Corresponding Knowledge Profiles". The content of this patent is incorporated in its entirety herein. After receiving an invitation email, a reviewer may decide to accept or reject the invitation (as shown in steps 3200-3220 for multiple reviewers). If the reviewer accepts the invitation, then in step 3230 the publishing system determines if the reviewer is registered. If yes, the reviewer may proceed to login in step 3240. If no, the reviewer is directed to a registration process, such as the registration process shown in FIG. 1. After login, the reviewer may have the following options as shown in step 3260. For example, the reviewer may be given access to the submitted article. The reviewer may also be able to communicate with other reviewers or editors or invite other co-reviewers. The reviewer may also be given access to certain scientific journals, including through services such as Scopus and ScienceDirect. Then, in step 3270, the reviewer reviews and annotates the submitted article. In a preferred embodiment, the system allows for annotation of the online version of the article. The reviewer may also have the option to recommend language editing. If review is completed, the reviewer in step 3310 submits or uploads the review comments to the publishing system. The reviewer may also terminate the review voluntarily.

If a reviewer decides to reject an invitation, then the system in step 3060 notifies the editor about the rejection. The system in step 3080 checks if the editor has selected alternative reviewer(s). If yes, then in step 3070 the system sends an invitation email to the alternative reviewer. If no, the process will wait for the editor to send an ad hoc invitation or to search for reviewer(s).

After receiving the review comments, the publishing system in step 3090 sends a notification email to the editor, collates review comments in step 3100 if the comments are done in CRF, and sends the comments to the editor. After receiving the comments, the editor in step 3110 manages/validates the review comments, and in step 3120 rates the reviewers based on the comments submitted. Then, in step 3130, the editor decides if changes need to be made in the submitted article. If no, the article is passed to a decision process in step 3140. If yes, the editor in step 3150 requests the publishing system to notify the author that changes are requested. Then, the publishing system in step 3160 sends a notification email to the author and the article is passed to a revision process in step 3170.

Figure 6:
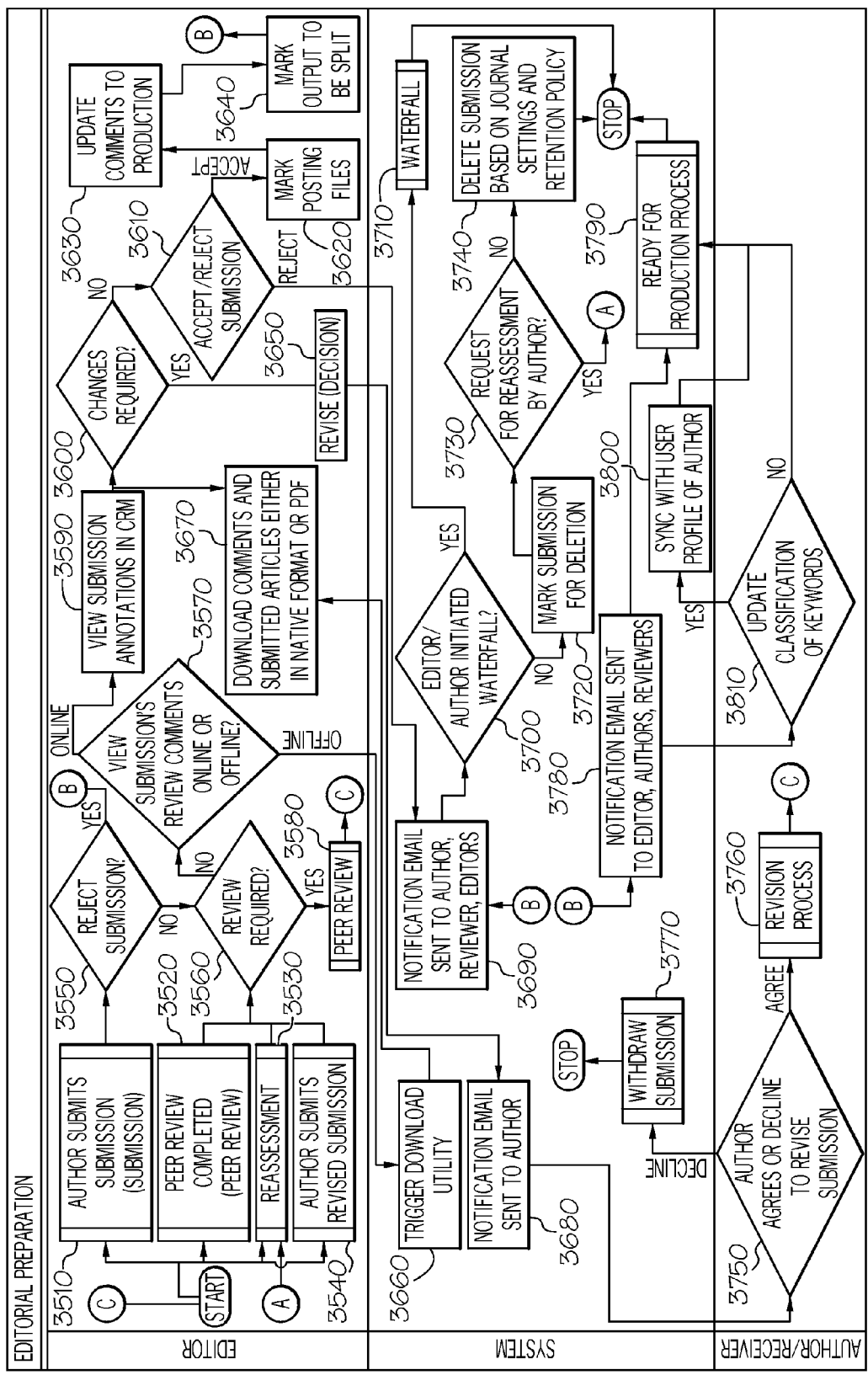
FIG. 6 schematically depicts a decision preparation process that is implemented on one or more computers in one or more networks according to one embodiment of the invention.

FIG. 6 schematically depicts a decision preparation process that is implemented on one or more computers in one or more networks according to one embodiment of the invention. The decision process may be initiated by the following situations: 1) an author submits an article (step 3510); 2) peer review of an article is completed (step 3520); 3) reassessment of a prior decision (step 3530) and 4) an author submits a revised article (step 3540). If the editor receives a submission from an author, then in step 3550 the editor decides if the article should be rejected without review. If no, the editor in step 3560 decides if peer review is required, and if so the process moves to the peer review process in step 3580, and then returns to step 3520. If the article should be rejected without review, then in step 3690 the publishing system sends a notification email to other editor(s), the author and reviewers regarding the rejection. Next, in step 3700 the system determines if the editor and author have initiated a "waterfall" process to transfer the article to another journal. If yes, then the waterfall process will process in step 3710. If no, the article is marked for deletion in step 3720, and then in step 3730 the system determines if the author has requested reassessment. If the author has requested reassessment, the process moves to step 3530. If the author has not requested reassessment, the article is deleted in step 3740 based on journal settings and retention policy.

If the decision process is triggered by situations 2-4 above, then the process moves to step 3560, where the editor decides if peer review is required. If review is triggered, then the process moves to the peer review process in step 3580. If review is not triggered, in step 3570 the editor decides if he/she will view the review comments (annotations) online or offline. If offline, then in step 3660 the publishing system's download utility is triggered and in step 3670 the editor downloads comments and submitted articles either in native format or in PDF. If online, the editor will view the article with comment annotations in CRF in step 3590.

After reviewing the comments, the editor in step 3600 decides if changes are required. If changes are required, the editor in step 3650 makes a decision to request revision and sends the decision to the publishing system. The publishing system in step 3680 sends a notification email to the author for revision. The author, then, in step 3750 decides if he/she would agree or decline to revise the submission. If he/she agrees to revise, then the process moves to a revision process in step 3760, and then returns to step 3540. If the author declines to revise, then the process moves to a withdraw process in step 3770.

If the editor decides that no change is required in step 3600, then in step 3610, the editor decides whether to accept or reject the article based on the comments. If the editor decides to reject, then in step 3690, the publishing system sends a notification email to other editor(s), the author and reviewers regarding the rejection, and the process moves to step 3700 as described above. If the editor decides to accept, then in step 3620, the files related to the article are marked for publication. Next, in step 3630 comments are updated to production and in step 3640, the output is marked to be split. The publishing system then, in step 3780, sends a notification email to other editor(s), the author and reviewers.

Figure 7:
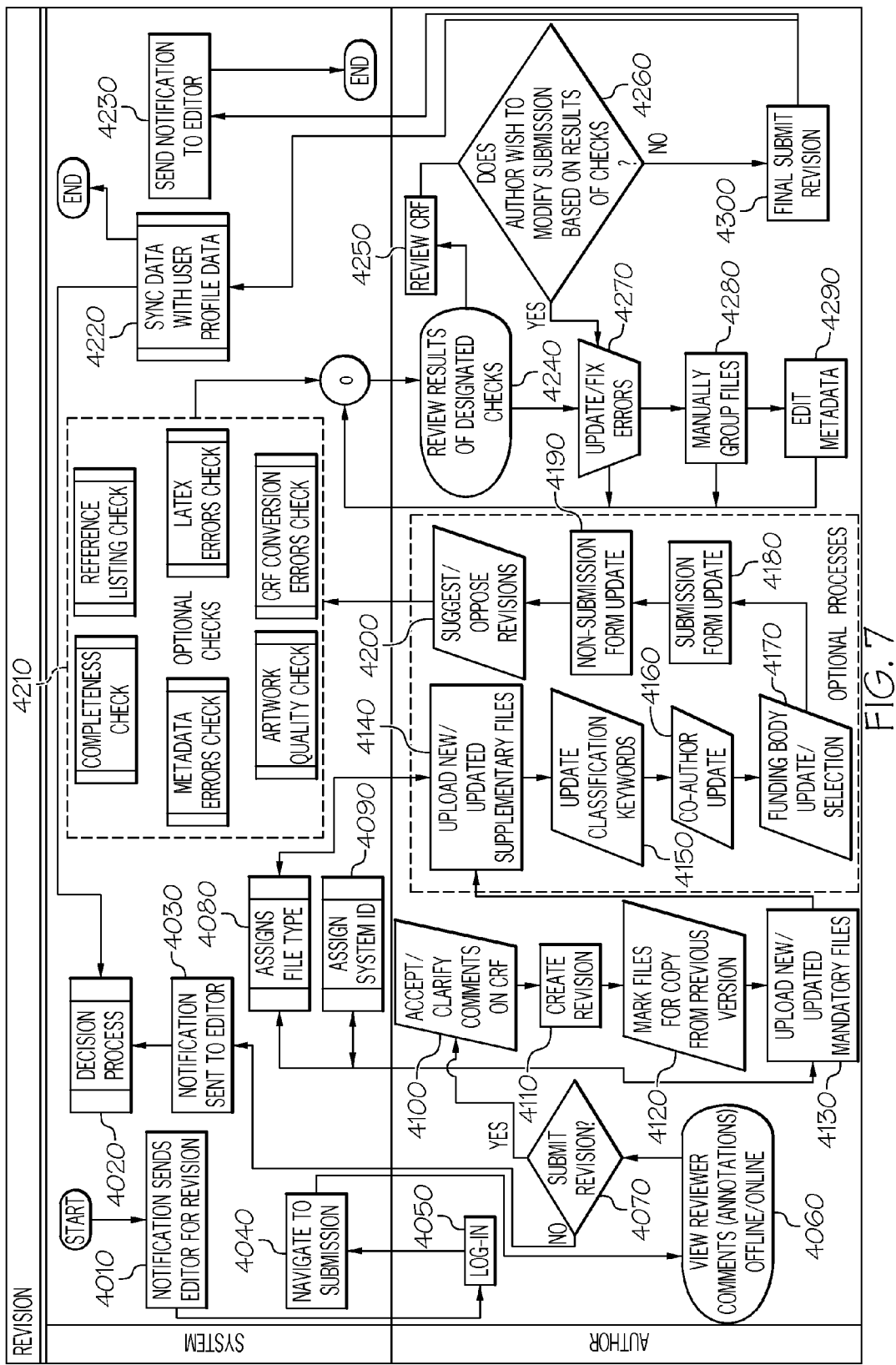
FIG. 7 schematically depicts a revision process that is implemented on one or more computers in one or more networks according to one embodiment of the invention.

FIG. 7 schematically depicts a revision process that is implemented on one or more computers in one or more networks according to one embodiment of the invention. The process starts from step 4010, where the publishing system sends an email notification to the author regarding the editor's request for revision. The author then proceeds to login in step 4050, and navigates to his/her submission in step 4040. The author then views the review comments, either offline or online, in step 4060 and decides in step 4070 if he/she will submit revision. If no, then the publishing system in step 4030 sends a notification to the editor and the process moves to a decision process in step 4020. If yes, then the author in step 4100 accepts or clarifies comments on CRF and creates a revised version in step 4110. Then, in step 4120 the files associated with the submitted article are marked for copying from the previous version, and the new or updated files are uploaded to the publishing system in step 4130. The publishing system may assign file type in step 4080 and assign system ID to the submitted files in step 4190.

Optionally, the author may also upload new or updated supplemental files to the publishing system in step 4140, update classification/keywords in step 4150, update co-author in step 4160, update funding body in step 4170, perform submission form update in step 4180 and non-submission form update in step 4190, as well as suggest or oppose reviewers in step 4200. After the results of steps 4140-4200 above are uploaded to the publishing system, the system may optionally perform a number of checks on the updated submission in step 4210. These checks may include completeness check, reference linking check, metadata errors check, artwork quality check, CRF conversion errors check and LaTex errors check.

The author may review the results of the above checks in step 4240 and review the CRF in step 4250. Next, in step 4260, the author decides if he/she wishes to modify the submission based on the results of the checks. If no, the author makes a final submission of the revision in step 4300. The publishing system then sends a notification to the editor in step 4230, and syncs the revision data with the author's user profile data in step 4220. The process then moves to the decision process in step 4020. If the author decides to modify the submission based on the results of the checks, then the author in step 4270 updates and fixes the errors and may choose to re-check the files. Or, the author may manually group the files in step 4280 and submit for a re-check. Or, the author may edit the metadata of the files and submit for a re-check.

Figure 8:
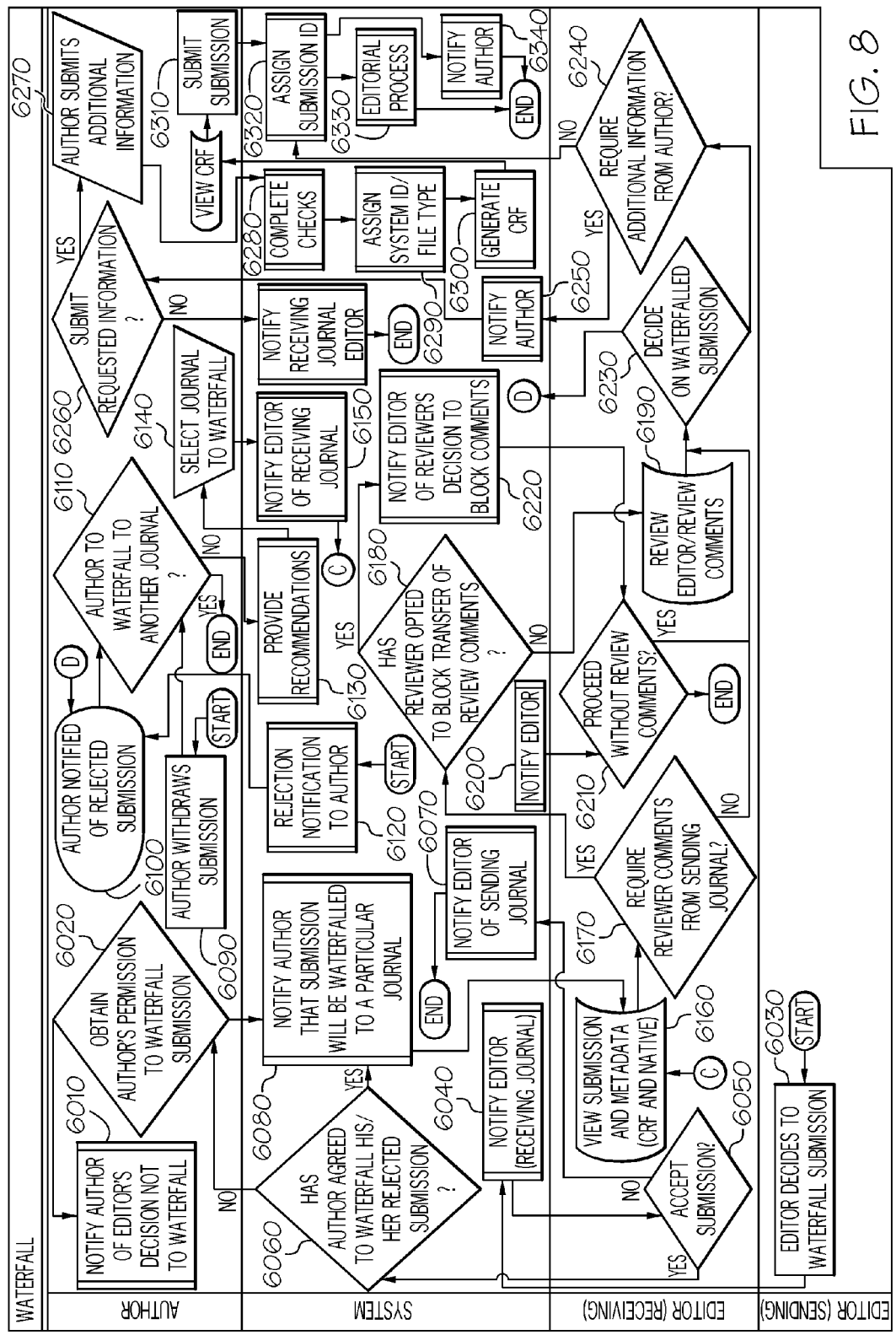
FIG. 8 schematically depicts a waterfall process that is implemented on one or more computers in one or more networks according to one embodiment of the invention.

FIG. 8 schematically depicts a waterfall process that is implemented on one or more computers in one or more networks according to one embodiment of the invention. The waterfall process is the transfer of submitted articles from one journal to another journal. The waterfall process may be initiated by an editor of a sending journal who decides to waterfall a submission to a receiving journal, as shown in step 6030. After learning the editor's decision, the publishing system then notifies the editor(s) of the receiving journal in step 6040. The editor(s) of the receiving journal in step 6050 decides whether to accept the submission. If no, then the editor of the sending journal is notified in step 6070 and the waterfall process will end. If yes, the publishing system in step 6060 checks if the author has agreed to waterfall his/her rejected submission. If no, then the publishing system in step 6020 asks the author's permission to waterfall the submission. If the author declines to waterfall, then in step 6010 the editor is notified of the author's decision not to waterfall. If the author accepts waterfall, then the publishing system in step 6080 notifies the author that the submission will be waterfalled to a particular journal. If the publishing system in step 6060 finds the author has agreed to waterfall his/her rejected submission, then the process also moves to step 6080 above. Following step 6080, the editor of the receiving journal in step 6160 views the submission and metadata (CRF or native format). Then, in step 6170, the editor decides if he/she will require reviewer comments from the sending journal. If no, then the editor will decide on the waterfalled submission in step 6230. If the editor will require the reviewer comments, then in step 6180, the publishing system checks if the reviewer has opted to block the transfer of review comments. If yes, the system notifies the editor of the reviewer's decision to block comments in step 6220, and the editor decides in step 6210 whether to proceed without review comments. If no, the waterfall process will end. If yes, the process moves to step 6230 above. If the reviewer does not block the comments, then in step 6190, the editor reviews the editor/review comments and the process moves to step 6230 above.

After step 6230, the editor decides to reject or accept the submission for waterfall. If the submission is rejected, then in step 6100 the author is notified of the rejection, and in step 6110, the author decides whether to waterfall the submission to another journal. If no, then the waterfall process will end. If yes, then in step 6130 the publishing system may provide journal recommendations to the author via the journal recommendation tool, and the author may select a journal to waterfall in step 6140. The publishing system then notifies the editor of the receiving journal in step 6150. The process then moves to step 6160 above.

The journal recommendation tool is operable to recommend a journal to the author if the journal has published articles which have a high similarity with the newly submitted article. In one embodiment, the system determines whether a journal's published articles have a high similarity to the newly submitted article by creating a fingerprint of all published articles of a journal, and then comparing them to the fingerprint of the submission. The similarity can be expressed as a match rate. The list of recommended journals can be initially sorted based on the match rate. Optionally, the user is able to view the following aspects of a journal: Impact factor, Speed of publication and Acceptance rate.

If the editor decides to accept a submission for waterfall in step 6230, then in step 6240, the editor decides whether to require additional information from the author. If no, then the publishing system in step 6320 assigns submission Id to the submission being waterfalled, notifies the author in step 6340, and moves the process to the editorial process in step 6330. If the system requires additional information from the author to submit to this specific journal, then in step 6250 the publishing system notifies the author for additional information. The author in step 6260 decides whether to submit requested information. If no, then the publishing system notifies the editor of the receiving journal in step 6350 and the waterfall process ends. If yes, then the author in step 6270 submits the additional information. The publishing system, then, in step 6280 performs various checks as described above, assigns system Id and file Id in step 6290 and generates a CRF in step 6300. The author in step 6310 views the CRF and submits the submission in step 6315. The process then moves to step 6320 above.

Figure 9:
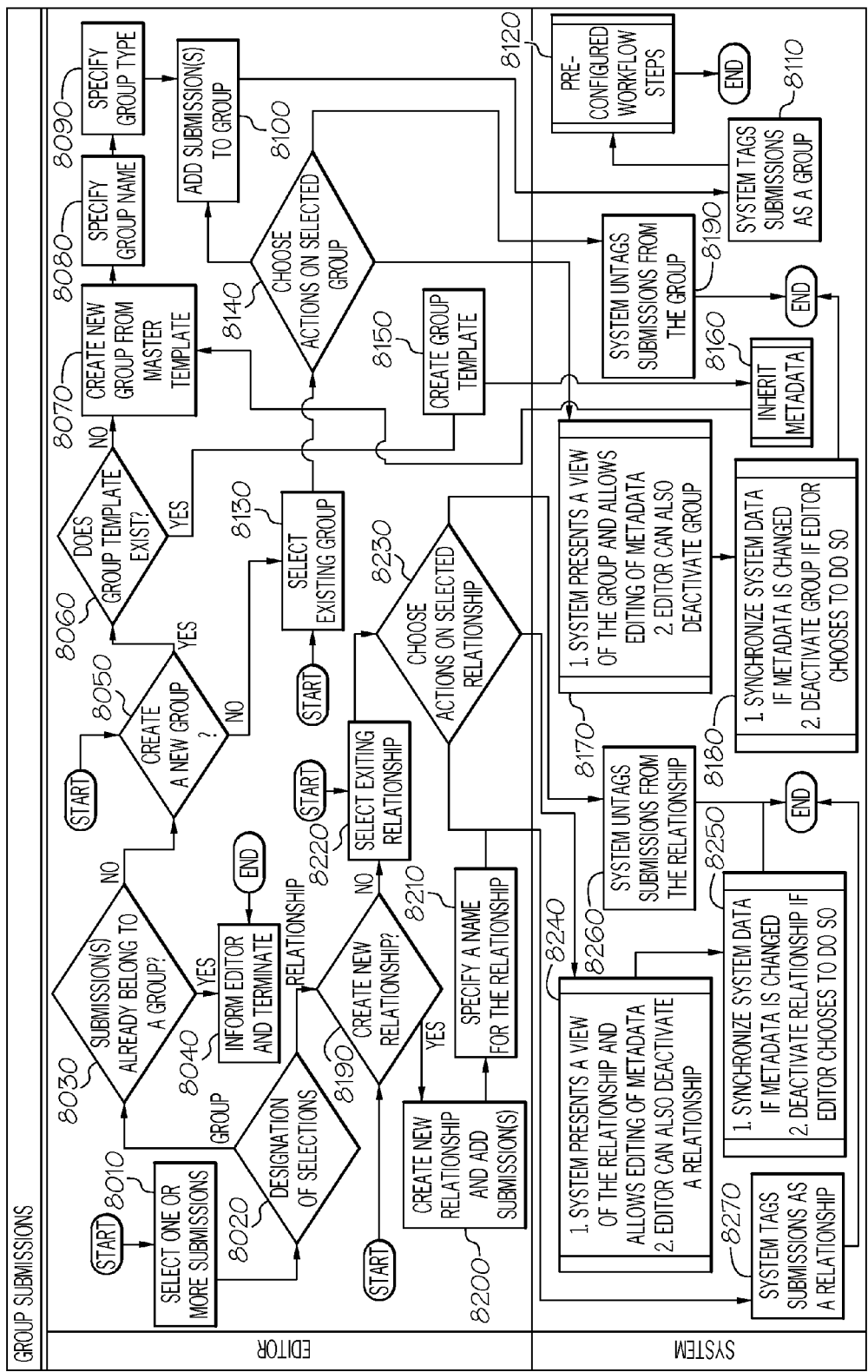
FIG. 9 schematically depicts a group submissions process that is implemented on one or more computers in one or more networks according to one embodiment of the invention.

The waterfall process may also be triggered by an author when he/she withdraws a submission, as shown in step 6090. If so, the author is prompted to decide if he/she wants to waterfall the submission to another journal as shown in step 6110 above. Alternatively, when the publishing system sends an author a rejection notice (following an editor's decision based on peer review), as shown in step 6120, then the process moves to step 6100 above FIG. 9 schematically depicts a group submissions process that is implemented on one or more computers in one or more networks according to one embodiment of the invention. As show in FIG. 9, the editor may select one or more submissions in step 8010. Then, in step 8020, the editor decides whether to designate the selected submissions as Relationship or Group. If the editor decides to create a relationship (not group) for the selected submissions, then the process moves to step 8190, where the editor decides whether to create a new relationship. If the editor wants to designate the submissions as a group, then the editor checks in step 8030 if the submissions already belong to a group. If yes, the editor is so informed and the process ends. If no, the editor in step 8050 decides whether to create a new group. If no, the editor in step 8130 selects the existing group. If yes, then the editor in step 8060 checks if a group template exists and in step 8070 creates a new group from the master group template. If no, then the editor in step 8150 creates a group template, inherits metadata in step 8160 and the process moves to step 8070 above. After the new group template is created, the editor in step 8080 specifies the group name, and specifies the group type in step 8090. Then in step 8100, the editor may add other submissions to the new or selected group. The publishing system then tags the submissions as a group in step 8110. Then, in step 8120, the system executes the workflow steps such as the various checks as described before.

If the editor selects an existing group, as shown in step 8130, then in step 8140 the editor chooses the actions on the selected group. If he/she chooses to add other submissions to the group, then the process moves to step 8100 above. If he/she chooses to remove certain submissions from the group, then the publishing system in step 8190 untags the submissions to be removed from the group and the group submissions process ends. If the editor chooses to view or edit group metadata, then the publishing system in step 8170 presents a view of the group and allows the editor to edit the metadata of the group. The editor can also deactivate a group from the view. Then, in step 8180 the system synchronizes system data if the group's metadata is changed and deactivates the group if the editor chooses to do so. The process then ends.

If the editor decides in step 8190 to create a new relationship for the selected submissions, then in step 8200 the editor creates the new relationship and may also add submissions to the new relationship. Next, in step 8210, the editor specifies a name for the new relationship. The publishing system then tags the submissions as a relationship as specified by the editor in step 8270. If the editor decides in step 8190 not to create a new relationship for the selected submissions, then in step 8220 the editor selects an existing relationship and in step 8230 chooses actions on the selected relationship. If the editor chooses to add submissions, then the process moves to step 8270 above. If the editor chooses to view relationship or edit relationship metadata, then the publishing system in step 8240 presents a view of the group and allows the editor to edit the metadata of the group. The editor can also deactivate a group from the view. Then, in step 8250 the system synchronizes system data if the group's metadata is changed and deactivates the group if the editor chooses to do so. The process then ends. The editor may also choose to remove certain submissions from the relationship. If that is the case, then the publishing system in step 8260 untags these submissions to be removed from the relationship, and the process ends.

Figure 10:
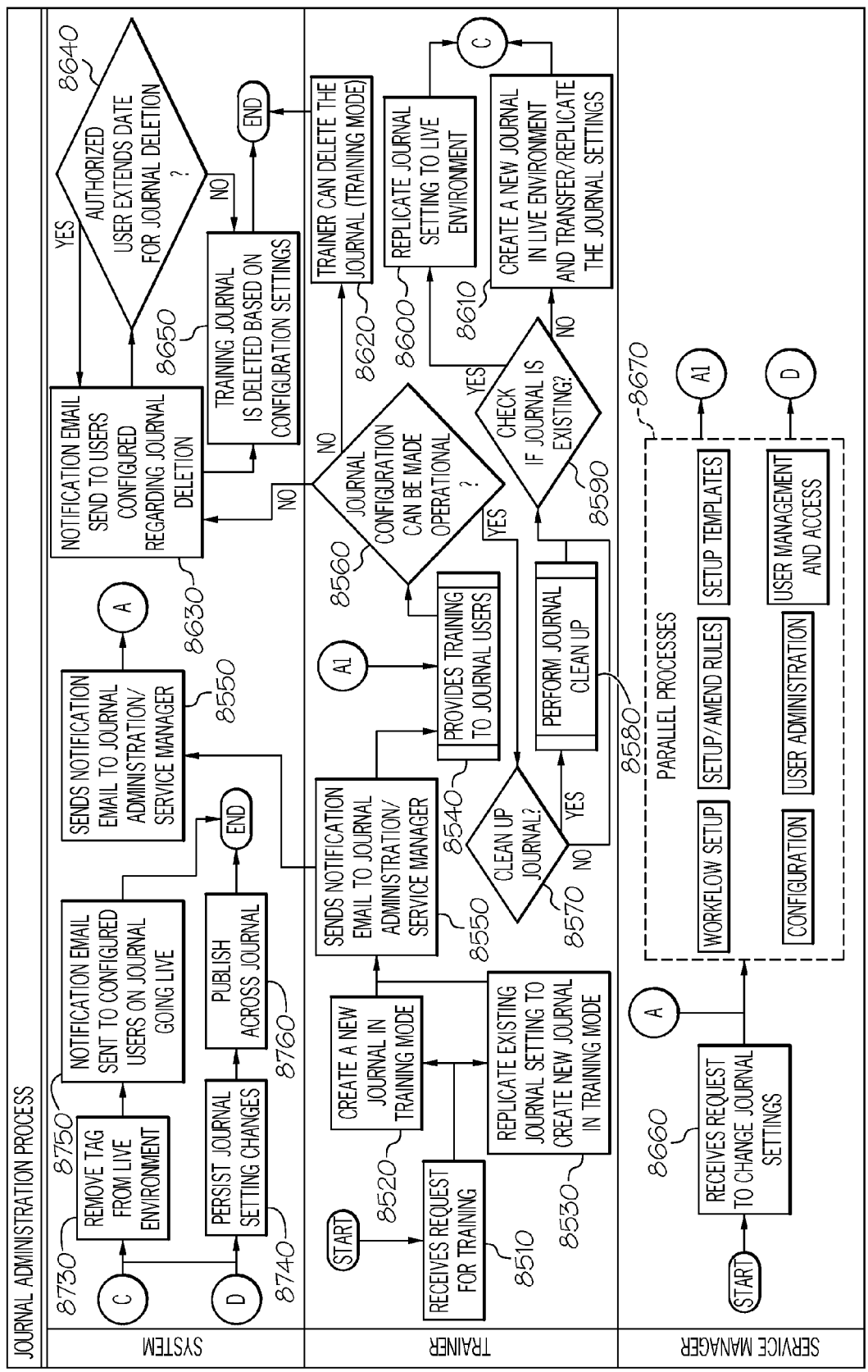
FIG. 10 schematically depicts a training/journal administration process that is implemented on one or more computers in one or more networks according to one embodiment of the invention.

FIG. 10 schematically depicts a training/journal administration process that is implemented on one or more computers in one or more networks according to one embodiment of the invention. As shown in FIG. 10, when a trainer receives a request for training in step 8510, the trainer may either create a new journal in training mode as shown in step 8520; or replicate an existing journal setting to create a new journal in training mode, as shown in step 8530. In one embodiment, the trainer may be a staff member of the company running the journal system. Training sessions may be provided in person, or through web applications such as WebEx. The trainer then in step 8535 invites journal administrator/service managers or other users for training, and then provides training to journal users in step 8540. When step 8535 is executed, the publishing system also sends a notification email to the journal administration/service manager in step 8550. Then, in step 8560, the trainer decides whether the journal configuration can be made operational. If no, then in step 8620 the trainer deletes the journal in training mode and the process ends. The publishing system also sends a notification email to users configured regarding journal deletion in step 8630, and the training journal is deleted based on configuration settings in step 8650. An authorized user can also choose to extend the date for journal deletion, in step 8640

If the trainer does not think the journal configuration can be made live, then in step 8570 the trainer decides whether to clean up the journal. If yes, the trainer performs journal clean up in step 8580 and the process moves to step 8590. If no, then the process directly moves to step 8590, where the trainer checks if the training journal is an existing journal. If yes, the trainer in step 8600 replicates the journal setting to live environment. If no, the trainer creates a new journal in live environment in step 8610 and transfers/replicates journal settings the settings of the training journal to the new journal.

After steps 8600 or 8610, the publishing system either removes the test tag from the live environment in step 8730 and sends a notification email to configured users regarding the test journal going live in step 8750, or persists journal setting changes in step 8740 and publishes the setting changes across journal in step 8760. The process then ends.

In one embodiment, the service manager may receive requests to change journal settings to training, as shown in step 8660. Or, he/she may receive notifications from the publishing system to participate in trainings. If that happens, the service manager may in step 8670 execute the following in parallel for the training journal: workflow setup for training, setup/amend rules, set up templates, configuration, user administration and user management and access. The process then moves to step 8540 for the trainer and to step 8730 or 8740 for the system.

Figure 11:
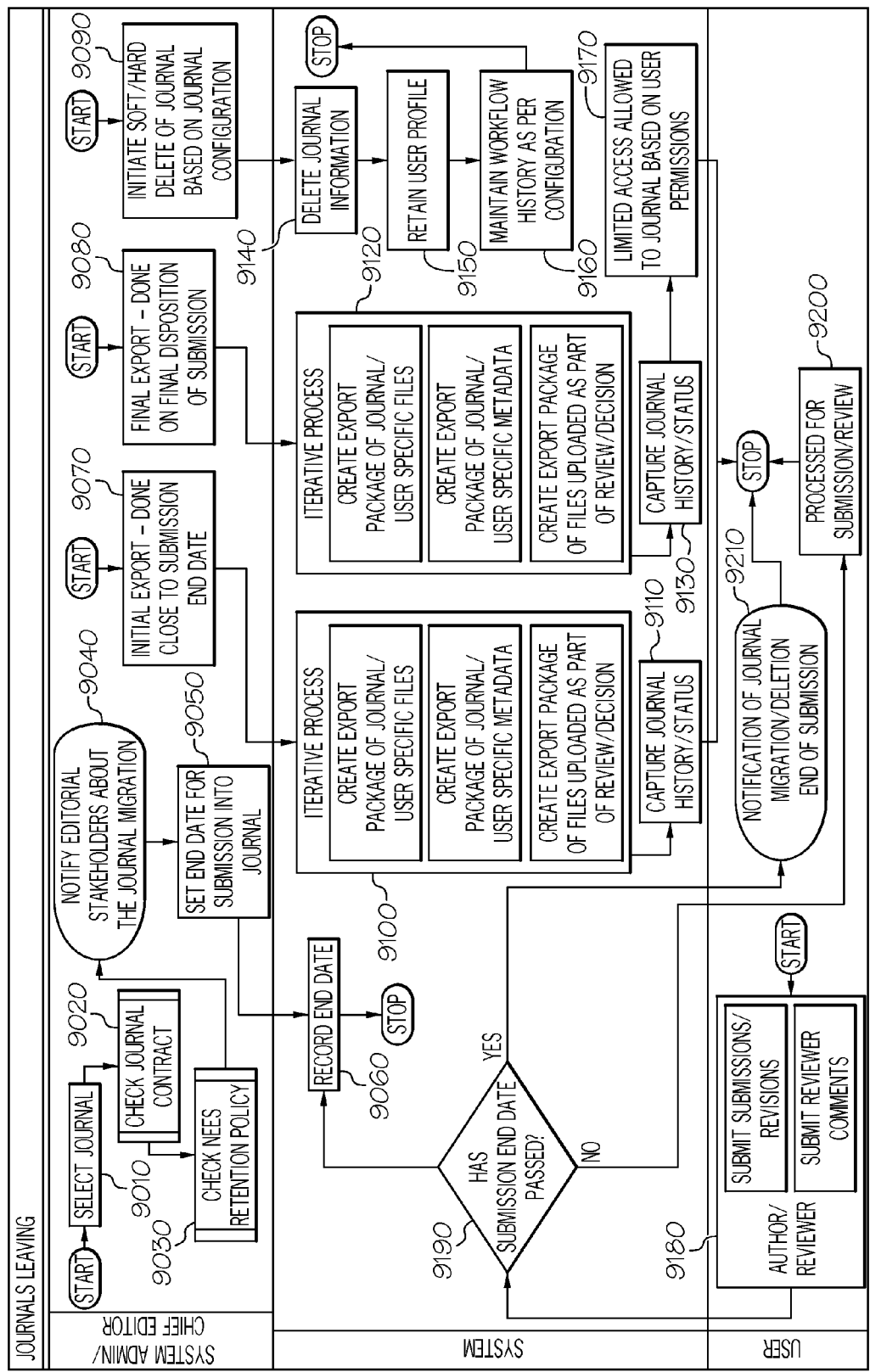
FIG. 11 schematically depicts a journals leaving process that is implemented on one or more computers in one or more networks according to one embodiment of the invention. The journals leaving process may be triggered when a journal leaves the publishing system.

FIG. 11 schematically depicts a journals leaving process that is implemented on one or more computers in one or more networks according to one embodiment of the invention. The journals leaving process may be triggered when a journal leaves the publishing system. As shown in FIG. 11, the system administrator/chief editor in step 9010 selects a journal to be removed. Then, in step 9020, the journal contract is checked, and the system retention policy is checked in step 9030 for conformity. Next, the system administrator/chief editor in step 9040 notifies editorial stakeholders about the journal migration. On confirmation of all of the above, the system administrator/chief editor in step 9050 sets an end date for submission into the journal. The system in step 9060 records the end date. When a user makes a submission/or submits a revision in step 9180, the publishing system in step 9190 checks if the submission date is passed. If no, the process moves to submission/peer review in step 9200. If yes, then the user is notified of journal migration/deletion and end of submission in step 9210.

In one embodiment, the system administrator/chief editor may initiate an initial export process when the time is close to the submission end date, as shown in step 9070. If that process is initiated, the publishing system in step 9100 executes an iterative process to create an export package of journal/user specific files, journal/user specific metadata and files uploaded as part of review/decision. Then, in step 9110, the system captures journal history/status.

In another embodiment, the system administrator/chief editor may initiate a final export process on final disposition of a submission, as shown in step 9080. If that process is initiated, the publishing system in step 9120 executes an iterative process to create export package of journal/user specific files, journal/user specific metadata and files uploaded as part of review/decision. Then, in step 9130, the system captures journal history/status, and in step 9170, only limited access is allowed to the journal based on user permissions.

In yet another embodiment, the system administrator/chief editor may initiate soft/hard delete of the journal based on journal configuration, as shown in step 9090. If that process is initiated, the publishing system in step 9140 deletes journal information and retains user profiles in step 9150. The system also maintains workflow history as per configuration in step 9160.

The invention described above is operational with general purpose or special purpose computing system environments or configurations. Examples of well known computing systems, environments, and/or configurations that may be suitable for use with the invention include, but are not limited to: personal computers, server computers, hand-held or laptop devices, smart phones such as iPhones™, tablet devices such as iPads™, multiprocessor systems, microprocessor-based systems, set top boxes, programmable consumer electronics, network PCs, minicomputers, mainframe computers, distributed computing environments that include any of the above systems or devices, and the like. It should be understood that references to a 'computer' in this specification—for example, an editorial computer or a system computer—include references to both physical and logical computers, where a logical computer may reside in one or more physical computers, one or more logical computers may reside in one physical computer, and logical computers may be part of a cloud computing system. It should also be understood that references to a 'database' in this specification—for example a journal database and a non-sister journal database—include references to databases that may be physically distinct or logically distinct (for example, virtual databases).

Components of the inventive computer system may include, but are not limited to, a processing unit, a system memory, and a system bus that couples various system components including the system memory to the processing unit.

The computer system typically includes a variety of non-transitory computer-readable media. Computer-readable media can be any available media that can be accessed by the computer and includes both volatile and nonvolatile media, and removable and non-removable media. By way of example, and not limitation, computer-readable media may comprise computer storage media and communication media. Computer storage media may store information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The computer system may operate in a networked environment using logical connections to one or more remote computers. The remote computer may be a personal computer, a server, a router, a network PC, a peer device or other common network node, and typically includes many or all of the elements described above relative to the computer. The logical connections depicted in include one or more local area networks (LAN) and one or more wide area networks (WAN), but may also include other networks. Such networking environments are commonplace in offices, enterprise-wide computer networks, intranets and the Internet.

For ease of exposition, not every step or element of the present invention is described herein as part of software or computer system, but those skilled in the art will recognize that each step or element may have a corresponding computer system or software component. Such computer systems and/or software components are therefore enabled by describing their corresponding steps or elements (that is, their functionality), and are within the scope of the present invention. In addition, various steps and/or elements of the present invention may be stored in a non-transitory storage medium, and selectively executed by a processor.

The foregoing components of the present invention described as making up the various elements of the invention are intended to be illustrative and not restrictive. Many suitable components that would perform the same or similar functions as the components described are intended to be embraced within the scope of the invention. Such other components can include, for example, components developed after the development of the present invention.

What is claimed is:

1. An online journal recommendation system, comprising:
one or more editorial computers connected to a multi-node network, said editorial computers comprising one or more program controlled data processors configured to:
receive an author-submitted article for publication via said multi-node network;
access journal database records, wherein said database records include information associated with previously submitted articles and corresponding author user profiles;
create a first fingerprint of a plurality of published articles in a particular journal from the journal database records;
create a second fingerprint of the author-submitted article;
compare the first fingerprint with the second fingerprint to determine whether the particular journal has articles with a high similarity to the author-submitted article;
recommend the particular journal to the author as a potential journal for submission of the author-submitted article when the particular journal has published articles which have a high similarity; and
when the author-submitted article is rejected from the particular journal:
receive a first input, from the author of the submitted article for publication, comprising a request to initiate a waterfall process for the rejected author-submitted article,
provide a first notification of the first input to a receiving journal device,
receive a confirmation to proceed from the receiving journal device,
transform the rejected author-submitted article into a waterfalled article,
transmit data comprising a submission to the receiving journal device,
wherein the submission comprises the waterfalled article and metadata,
receive a transmission from the receiving journal device, wherein the transmission comprises a rejection of the submission and an option to continue the waterfall process with a second receiving journal, and
when an affirmation of the option to continue the waterfall process with the second receiving journal is received:
transmit one or more journal recommendations to the author of the submitted article for publication, wherein the one or more journal recommendations comprise one or more potential receiving journals that contain articles having a high similarity with the waterfalled article, and
receive a second input from the author of the submitted article for publication comprising a selection of the second receiving journal and forward the waterfalled article to the second selected journal.

2. The journal recommendation system of claim 1, wherein one or more of said editorial computers select one or more submitted articles and process the selected articles as a group with shared properties.

3. The online journal recommendation system of claim 2, wherein one or more of said editorial computers create a group template for the selected articles.

4. The online journal recommendation system of claim 1, wherein said one or more program controlled data processors are further configured to convert one or more submitted articles to a Common Readable Format.

5. The online journal recommendation system of claim 4, wherein said Common Readable Format is Hypertext Markup Language or Extensible Markup Language.

6. The online journal recommendation system of claim 1, wherein one or more of the editorial computers automatically assigns editors according to rules and settings of the journal recommendation system.

7. The online journal recommendation system of claim 1, wherein one or more of the editorial computers search for reviewers by taking into account the author's preferred reviewers.

8. The online journal recommendation system of claim 1, wherein annotations to the author-submitted article are made in the author-submitted article.

9. A method of recommending an online journal, the method comprising:
receiving, by one or more editorial computers connected to a multi-node network, an author-submitted article for publication via said multi-node network;
accessing, by the one or more editorial computers, journal database records, wherein said database records include information associated with previously submitted articles and corresponding author user profiles;
creating, by the one or more editorial computers, a first fingerprint of a plurality of published articles in a particular journal from the journal database records;
creating, by the one or more editorial computers, a second fingerprint of the author-submitted article;
comparing, by the one or more editorial computers, the first fingerprint with the second fingerprint to determine whether the particular journal has articles with a high similarity to the author-submitted article;
recommending, by the one or more editorial computers, the particular journal to the author as a potential journal for submission of the author-submitted article when the particular journal has published articles which have a high similarity; and
when the author-submitted article is rejected from the particular journal:
receiving, by the one or more editorial computers, a first input, from the author of the submitted article for publication, comprising a request to initiate a waterfall process for the rejected author-submitted article,
providing, by the one or more editorial computers, a first notification of the first input to a receiving journal device,
receiving, by the one or more editorial computers, a confirmation to proceed from the receiving journal device,
transforming, by the one or more editorial computers, the rejected author-submitted article into a waterfalled article,
transmitting, by the one or more editorial computers, data comprising a submission to the receiving journal device, wherein the submission comprises the waterfalled article and metadata,
receiving, by the one or more editorial computers, a transmission from the receiving journal device, wherein the transmission comprises a rejection of the submission and an option to continue the waterfall process with a second receiving journal, and when an affirmation of the option to continue the waterfall process with the second receiving journal is received:
   transmitting, by the one or more editorial computers, one or more journal recommendations to the author of the submitted article for publication, wherein the one or more journal recommendations comprise one or more potential receiving journals that contain articles having a high similarity with the waterfalled article, and
   receiving, by the one or more editorial computers, a second input from the author of the submitted article for publication comprising a selection of the second receiving journal and forward the waterfalled article to the second selected journal.

10. The method of claim 9, further comprising selecting, by the one or more editorial computers, one or more submitted articles and processing, by the one or more editorial computers, the selected articles as a group with shared properties.

11. The method of claim 10, further comprising creating, by the one or more editorial computers, a group template for the selected articles.

12. The method of claim 9, converting, by the one or more editorial computers, one or more submitted articles to a Common Readable Format.

13. The method of claim 12, wherein said Common Readable Format is Hypertext Markup Language or Extensible Markup Language.

14. The method of claim 9, further comprising automatically assigning, by the one or more editorial computers, editors according to rules and settings.

15. The method of claim 9, further comprising searching, by the one or more editorial computers, for reviewers by taking into account the author's preferred reviewers.

16. The method of claim 9, wherein annotations to the author-submitted article are made in the author-submitted article.

* * * * *